No. 676,073. Patented June 11, 1901.
W. MUNN & A. LOTZ.
FISH CLEANING APPARATUS.
(Application filed Nov. 30, 1900.)
(No Model.) 4 Sheets—Sheet 3.
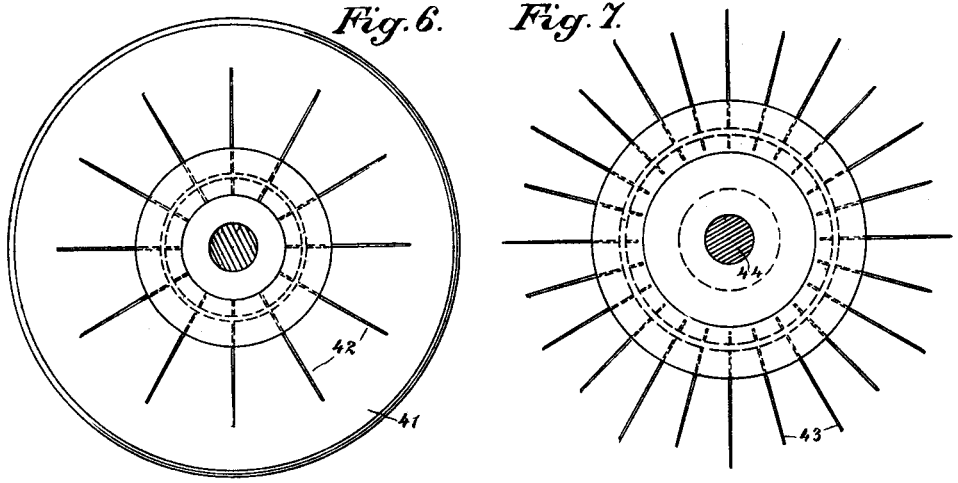
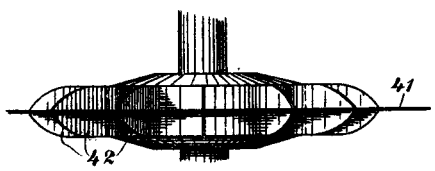
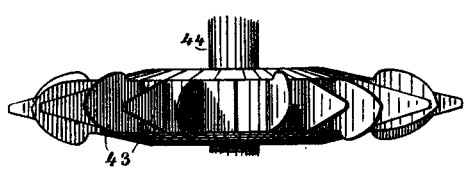
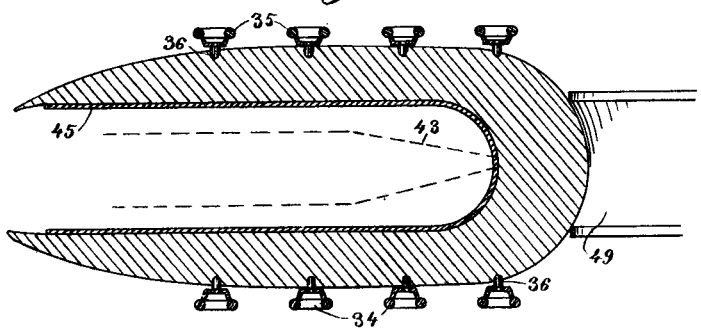

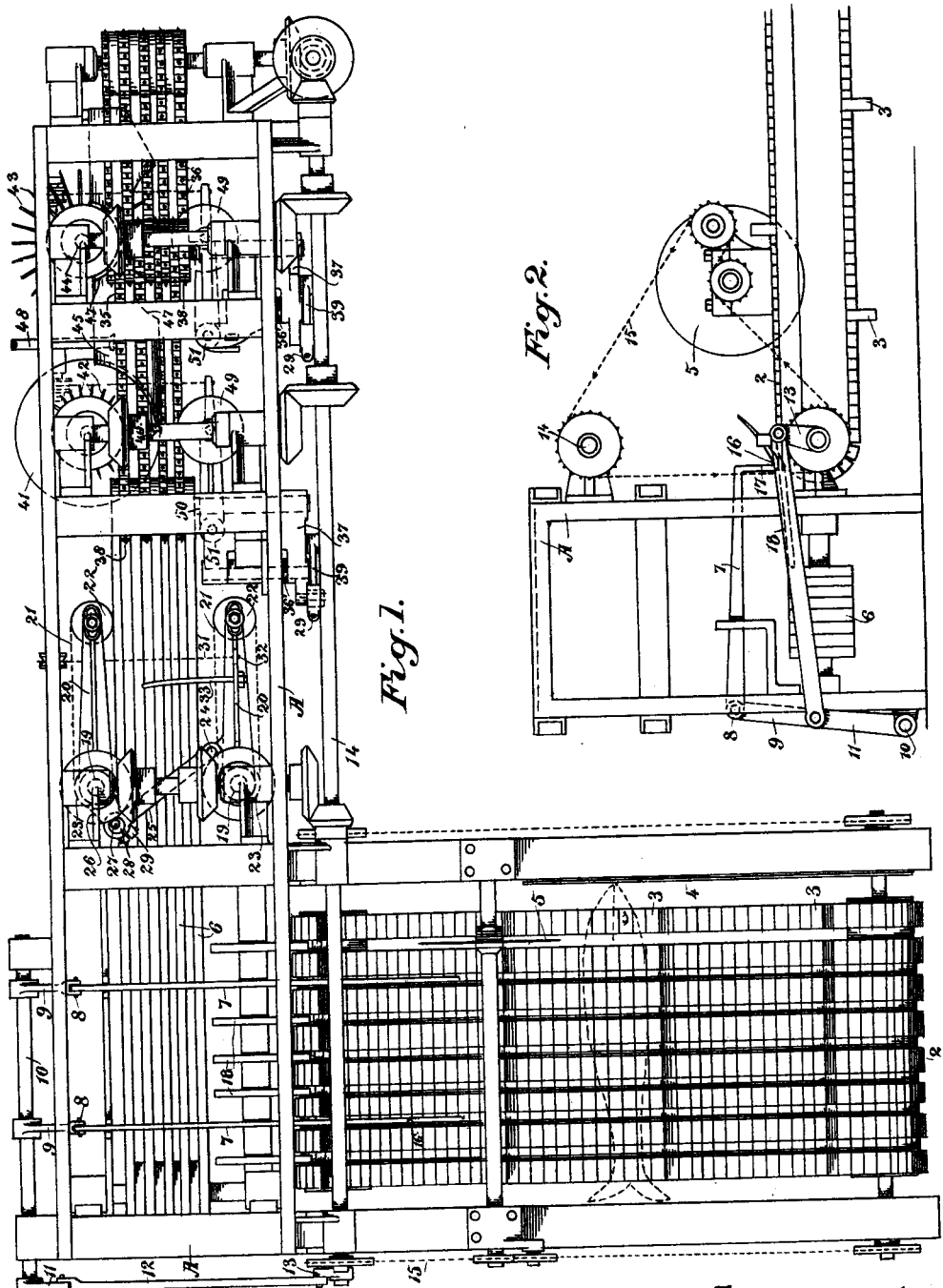

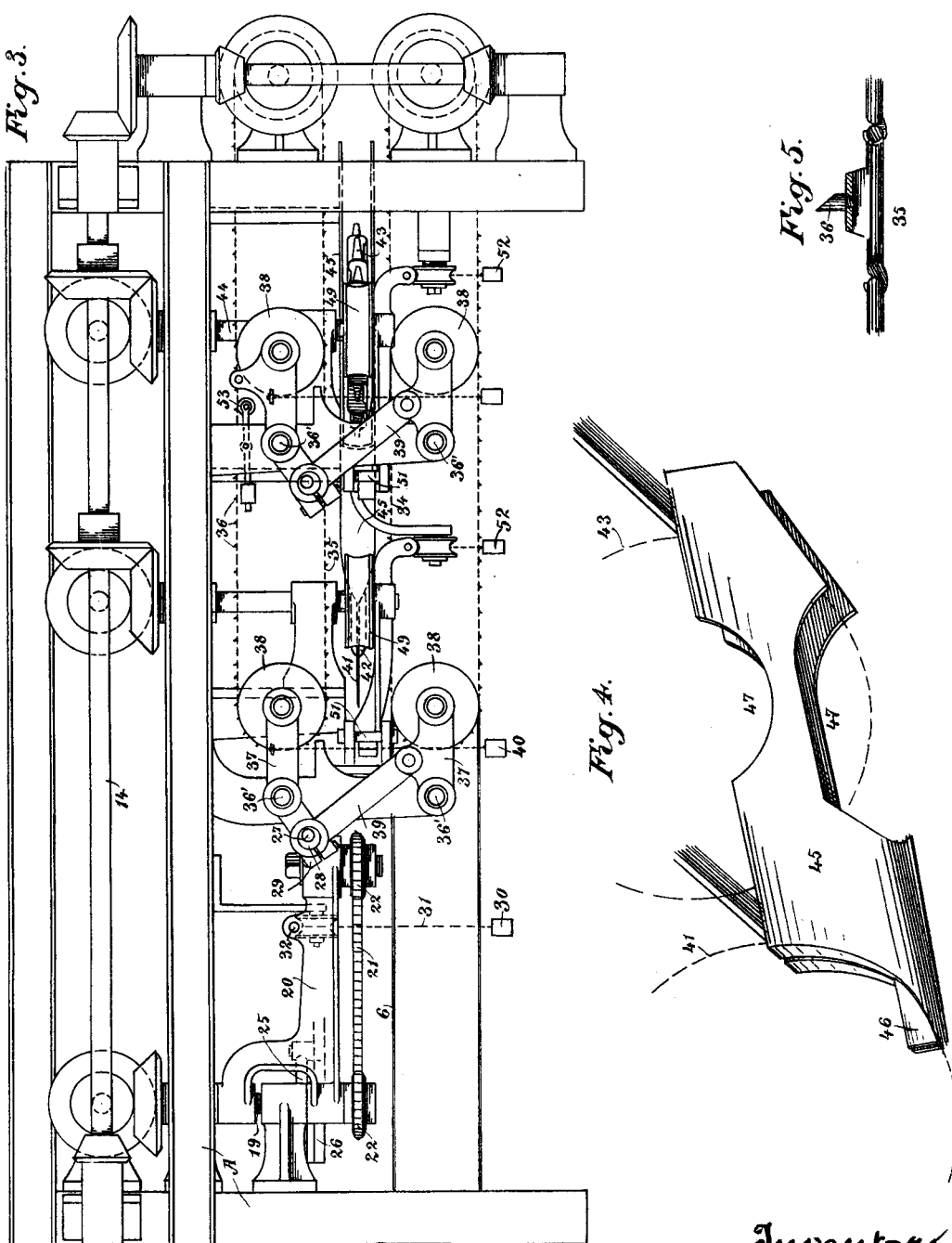

No. 676,073. Patented June 11, 1901.
W. MUNN & A. LOTZ.
FISH CLEANING APPARATUS.
(Application filed Nov. 30, 1900.)
(No Model.) 4 Sheets—Sheet 4.
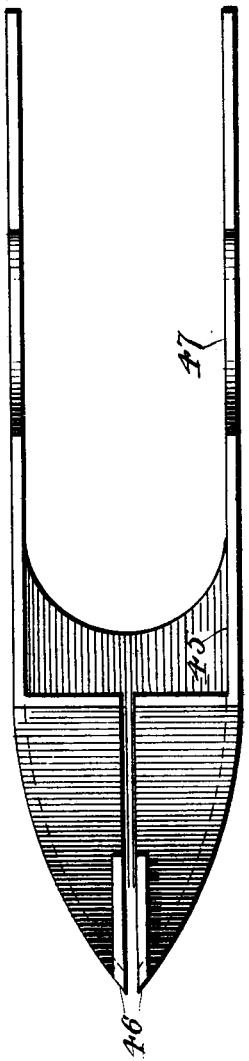
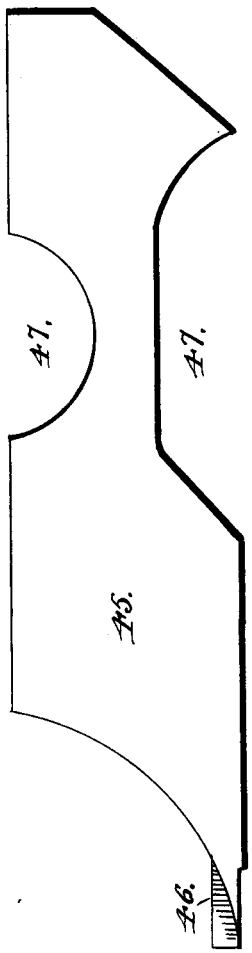
WITNESSES
INVENTORS
William Munn
Augustus Lotz
by Dewey Strong & Co
their Attorneys.

UNITED STATES PATENT OFFICE.

WILLIAM MUNN AND AUGUSTUS LOTZ, OF SAN FRANCISCO, CALIFORNIA, ASSIGNORS TO ALASKA PACKERS ASSOCIATION, OF SAME PLACE.

FISH-CLEANING APPARATUS.

SPECIFICATION forming part of Letters Patent No. 676,073, dated June 11, 1901.

Application filed November 30, 1900. Serial No. 38,156. (No model.)

*To all whom it may concern:*

Be it known that we, WILLIAM MUNN and AUGUSTUS LOTZ, citizens of the United States, residing in the city and county of San Francisco, State of California, have invented an Improvement in Fish-Cleaning Apparatus; and we hereby declare the following to be a full, clear, and exact description of the same.

Our invention relates to an apparatus which is designed to receive fish, pass them beneath a cutter by which the heads are severed, thence transfer the fish to other cutters by which the fish is opened, and to scrapers by which the insides are removed, and thence to cleaning-brushes and washing devices, and finally to the discharge, the whole being conducted continuously and automatically.

It consists of an endless carrier, upon which the fish is placed transverse to the movement of the carrier, a decapitating device, carriers arranged at right angles to the first carrier, means for receiving the fish upon these second carriers, adjustable guides upon these second carriers by which the alinement of the fish is maintained, devices by which the fish is opened and cleaned, and of details more fully to be set forth in the following specification and accompanying drawings, in which—

Figure 1 is a plan view of the apparatus. Fig. 2 is a front end view of the same. Fig. 3 is a front elevation of the cleaning portion of the apparatus. Fig. 4 is a view of the shield. Fig. 5 is a detail of the chain carrying the prongs. Figs. 6 and 8 are detail views of the cutter. Figs. 7 and 9 are similar views of the brush. Fig. 10 is a lateral section through the shield and connection, taken on a line between the cutter and brush. Fig. 11 is a plan view of the shield or spreader 45. Fig. 12 is a side view of Fig. 11.

A is a framework of any suitable dimensions, properly located and supported, and it is generally so arranged that the various vertical shafts and other parts are journaled above and extend downwardly, leaving the carriers free to travel below without the impediment of supports from that direction.

The first carrier 2 consists of an endless traveling belt or table, which may be composed of a suitable number of chains having transverse slats fixed or supported thereby and flexible enough in their union to easily travel around the pulleys at the ends upon which the endless traveling belt is supported. Transversely upon this endless table are arranged bars or projections 3 at suitable intervals, and the fish being laid against one of the projections the head will be placed against a horizontal guide, as shown at 4. The fish then being carried along by this traveling belt is brought into contact with a cutter 5, by which the head is severed. The fish is transferred from this carrier to another carrier, (shown at 6,) which moves at right angles with the first-named carrier. The transferring of the fish from the first carrier 2 after the head has been severed may be effected in various ways. We have shown rakes 7, fulcrumed, as at 8, to levers 9. These levers are fixed upon a rock-shaft 10. A lever 11, likewise fixed upon this shaft, is made to reciprocate through the connecting-rod 12 and crank 13. Power is transmitted to this crank, the carrier 2, and to the cutter 5 from the shaft 14, as by the belt 15. The rakes 7 are peculiarly bent or inclined at their front end, as 16, so that when the rakes are pushed forward the inclines 16 slide up over the body of the fish, and the vertical portions 17 drop behind the fish, and when the rakes are again moved backward the fish is drawn down the incline 18 and upon the second carrier 6. Throughout the rest of the machine the body of the fish is in line with the direction of travel. To maintain the body in this position and have it always presented properly to the opening and cleaning devices, certain guides are necessary. Upon each side of the carrier 6 are vertically-journaled shafts 19. A bracket 20 is supported turnably upon each of these shafts. Similar belts 21 are carried by a pulley 22 upon the brackets and a pulley 23 upon the shafts. The adjacent faces of these belts stand vertically opposed, so that the fish moving forward between them will be received and guided centrally upon the carrier. As the fish vary in size, it is necessary to provide for this variation and to allow the brackets, with their belts, to approach or draw away from each other. This is effected in the following manner. To one of the brackets is pivoted at 24 a rod or link 25. This link is connected with the other bracket through the arm or bracket projection 26. This projection 26 carries a pin 27. An eccentric collar 28 fits over this pin, and the end of the link 25 is adapted to clamp, as at 29, upon this collar. The object of the eccentric collar is to permit a variation in the length of the link and a corresponding variation in the movement or swing of the brackets. A weight, as 30, upon a cord or chain 31, is attached to one of the brackets, as at 32, and tends to draw the ends of these brackets always together. A brace-arm 33 may be provided, if desired, to prevent the ends of the brackets approaching beyond a certain point. Thus as the distance between the shafts 19 remains constant and the shafts act as fulcrums for the brackets the discharge ends of the belts on these brackets are allowed to close together or separate, as needed, without interfering with the continual driving of the apparatus. After passing between these belts the fish is next received between two planes of endless carriers, a lower one, 34, and an upper one, 35. These, like the other carriers, may be chains, except that certain of their links are provided with projecting points 36, which stick into the sides of the fish and hold it securely in place.

Just as we provided for a horizontal variation in the size of the bodies passing between the belts 21 it is necessary to allow for a vertical variation between the carriers 34 and 35. This is effected by an adaptation of the same means through shafts 36', levers 37, (the latter corresponding to brackets 20,) carrying pulleys 38, and links 39. A weight 40 tends to bring together the ends of the levers 37, with their corresponding carriers 34 and 35. The fish lying on its side and firmly held between the points on the carriers 34 and 35 is carried with its belly portion against the circular cutter 41, which splits the fish open from end to end. This cutter is provided with radial projections 42, which serve to prepare the body for the next step of cleaning. After the fish has thus been split open it is brought into line with the stripper or cleaner 43, which consists of a brush having radial arms mounted and rotating on an arbor 44. These arms sweep through the cavity opened by the cutter and the soft interior parts are thus removed. This brush is peculiarly formed, as shown in Figs. 7 and 9. Each alternating arm is straight and tapered, so as to reach into the back of the fish. Between these straight arms are other arms whose ends alternately turn upwardly and downwardly, so that the brush in its revolutions scrapes the back and the sides of the interior of the fish and thoroughly removes all the undesired parts. A shield or spreader 45 partly incloses the cutter and scraper and keeps the sides of the fish open during this part of the operation. This shield is shown in Figs. 4 and 10. It has its forward end or end in which a part of the cutter is incased narrowed and pointed, so as easily to enter the opening in the body of the fish. Guide-flanges 46 facilitate this. The shield is cut away, as at 47, for the projection of the scraper. Jets of water are also introduced through pipes or passages, as at 48, so that the operation of cleansing is accompanied by a stream of water which washes thoroughly the interior of the fish.

The fish is maintained in close contact against the cutter, brush, and spreader by means of grooved pulleys or rollers 49, which bear continuously against the back of the fish. These pulleys or rollers are adjustably mounted and act automatically through the levers 50. These levers are fulcrumed, as at 51, and are held in proper position either by springs or by weights, as 52.

In order to prevent the carrying-belts 34 and 35 from sagging too much by reason of great length, they may be made in comparatively short endless sections passing over pulleys, so that one set of belts may pass between the next set, and so on, practically forming a continuous carrying-surface. An automatic tension device, as 53, may also be provided.

The fish are finally discharged from the machine from carriers clear of teeth and are then in a clean condition and ready for further operation.

Having thus described our invention, what we claim as new, and desire to secure by Letters Patent, is—

1. In a fish-cleaning apparatus, an endless carrier, transverse bars or projections rising from the carrier and against the forward exterior walls of which the fish are adapted to be loosely placed, a cutter located near one side of the carrier, means for operating the cutter, and a horizontal guide at one side of the vertical plane of the cutter and against which the fish is fitted endwise said guide serving to position the fish with relation to the cutter.

2. In a fish-cleaning apparatus, an endless carrier upon which the fish are adapted to be carried in a position transverse to the line of travel, a second carrier running at right angles to the first-named carrier for carrying the fish parallel with its line of travel, a decapitating device operating in conjunction with the first-named carrier, and a transfer mechanism for delivering the fish from one carrier to the other.

3. In a fish-cleaning apparatus, an endless carrier, means for holding the fish in a transverse position upon this carrier, a horizontal guide for the end of the fish, a cutter, rakes having their engaging ends inclined outwardly, and means for reciprocating these rakes.

4. In a fish-cleaning apparatus, an endless carrier having transverse projections, a cutter operating in a vertical plane, a rock-shaft transverse to the line of the carrier, levers upon this rock-shaft, means connecting this rock-shaft with a crank by which the levers are oscillated, rake-arms attached to these levers, and a second endless carrier arranged at right angles to the first carrier.

5. In a fish-cleaning apparatus, the combination with an endless carrier, and means for depositing fish thereon and in horizontal alinement therewith, of adjustable guide-belts upon either side of the carrier whereby the alinement of the fish on the carrier is maintained.

6. In a fish-cleaning apparatus, the combination with an endless carrier of shafts arranged upon either side of this carrier, brackets turnably mounted upon the ends of these shafts, belts carried by pulleys upon these brackets and shafts, and means by which the opposing faces of these belts may be made automatically to approach each other or to separate.

7. In a fish-cleaning apparatus, the combination with an endless carrier of vertical shafts arranged above and upon either side of this carrier, brackets turnably mounted upon these shafts, belts carried by pulleys upon these brackets and shafts, a link pivotally attached to one bracket, a projection upon the other bracket to which the link is turnably and adjustably connected, and means by which the opposing vertical faces of the belts are always made to approach each other.

8. In a fish-cleaning apparatus, a guide device consisting of brackets carrying pulleys and turnably mounted upon shafts also carrying pulleys, belts carried upon these shaft and bracket pulleys, said belts having their faces opposed to each other, a link pivotally joined to one bracket, an arm projection upon the other bracket, a pin on this arm, an eccentric collar fitting this pin and means for securing the end of the link upon this collar.

9. In a fish-cleaning apparatus, the combination of endless carriers arranged in parallel planes, projecting points upon these carriers and means for adjusting the carriers so that they may be made automatically to approach each other or to separate.

10. The combination in a fish-cleaning apparatus of endless carriers upon which the body of the fish is maintained in alinement with the carriers, a revolving cutter, radial ribs upon this cutter, and means for removing the refuse from the interior of the fish.

11. In a fish-cleaning apparatus, a cleaner consisting of a revolving brush having two sets of radial arms, the arms of one set alternating with those of the other set and made straight and tapered and the arms of said other set having their edges extending alternately in opposite directions.

12. In a fish-cleaning apparatus, the combination of a cutter and cleaner consisting of a revolving disk having radial ribbed projections, a revolving brush with radial arms, a sheath or shield partially inclosing the disk and brush, said sheath adapted to spread the sides of the fish open by the cutter and to prepare it for the cleansing action of the brush.

13. In a fish-cleaning apparatus, the combination with endless carriers upon which the fish is carried in alinement therewith, of a cutter and cleaner partially incased in a sheath or spreader, of grooved pulleys arranged oppositely to this spreader, and means by which the position of these pulleys may be automatically adjusted in relation to the fish passing between these pulleys and the spreader.

14. A fish-cleaning apparatus consisting of an endless carrier, transverse projections upon this carrier, a guide arranged horizontally to this carrier, a cutter operating in a plane vertical to the carrier, endless carriers arranged at right angles to the first carrier, reciprocating rakes whereby the fish are delivered from the first carrier upon the second series of carriers, adjustable guides by which the alinement of the fish is automatically regulated upon these carriers, certain of these carriers provided with projecting points, a revolving cutter and a cleaning-brush arranged in a plane parallel to the planes of the carriers, a casing for the cutter and cleaner, grooved pulleys in approximately the same plane with the cutter and brush, and by which the fish is held in contact therewith, and means by which jets of water are directed into the interior of the fish.

15. A fish-cleaning apparatus consisting in combination of an endless carrier, with cleats arranged to carry the fish, a knife to sever the head of the fish, a rake to place the fish upon a carrier at right angles to the first carrier, a transverse self-centering guide by which the fish is directed in line upon a double self-centering carrier with upper and lower belts, said belts provided with spikes or sharp points for conveying the fish, mechanism for substantially simultaneously splitting the fish and scraping the interior walls thereof, and a form or spreader over which the split fish passes.

16. In a fish-cleaning apparatus, a cutter, radial blades concentric therewith and upon each side of said cutter whereby the cutting and cleaning operations occur substantially simultaneously, a revoluble driving-shaft common to both and means whereby the fish is presented to the cutter and slit along the central line of the belly.

17. In a fish-cleaning apparatus, a circularly-operating cutter, radial blades located upon each side of the cutter and operating substantially in unison therewith whereby the fish is slitted and cleaned substantially in one operation, a revoluble shaft common to both and a carrier by which the fish is moved to present the central line of the belly to the cutters and blades continuously.

18. In a fish-cleaning apparatus, a circular cutter, radial elastic blades fixed concentrically upon each side of the cutter, a shaft and means by which the cutter and blades are rotated, carriers and guides by which the fish is held and transmitted with the central line of the belly along the edge of the cutter and blades.

19. In a fish-cleaning apparatus, a circular cutter with radial elastic blades upon each side, a revoluble shaft common to both, a form over which the disemboweled fish passes from the cutter said form arranged in line with the cutter and blades, and carriers and guides by which the fish is transmitted successively along the plane of the cutter and thence upon the form.

20. In a fish-cleaning apparatus, a circular revoluble cutter and radial scrapers concentric therewith, a hollow form in line with the cutter, with scoop-shaped front, curved to approximately follow the periphery of the cutter, and guides and carriers by which the fish is moved to slit the belly longitudinally, coincidently extract the entrails, and thereafter to slip over the form.

21. In a fish-cleaning apparatus, a circular revoluble cutter and radial scrapers revoluble in unison therewith, a hollow scoop-shaped form over which the disemboweled fish passes from the cutter and scrapers, and means for transmitting the fish over the successive devices.

22. In a fish-cleaning apparatus, a circular revoluble cutter with radial scrapers upon each side thereof said cutter and scrapers being upon an axis common to both whereby they are revoluble in unison, and guides and carriers by which the fish is transmitted and slit along the central line of the belly, so that the entrails are extracted in unison with the cutting and in close proximity with the front edge of the slit.

23. In a fish-cleaning apparatus, a circular cutter and concentric radial blades revoluble in unison, a hollow scoop-shaped form in line therewith, over which the disemboweled fish is passed from the cutter, and a supplemental revoluble scraper turnable within the form and the opened cavity of the fish.

24. In a fish-cleaning apparatus, a circular cutter and concentric radial blades revoluble in unison, a hollow scoop-shaped form in line therewith over which the disemboweled fish is passed, the back of said form being open to expose the central cavity, and a series of pointed and curved radial scrapers revoluble within the open part of the form and cavity.

25. In a fish-cleaning apparatus, revoluble splitting and entrail-extracting blades, and a hollow form to receive the opened fish, guides, and carriers by which the fish is transmitted along the line of the cutter and cleaning-blades and upon the form, and spurs projecting from the carriers, said spurs having knife-edges transverse to the line of travel.

26. In a fish-cleaning apparatus, carriers by which the fish is transmitted longitudinally and spurs projecting from the carriers to enter the sides of the fish, said spurs having beveled edges transverse to the line of travel whereby the fish may be moved transversely while engaged without tearing the flesh.

27. In a fish-cleaning apparatus, concentric splitting and disemboweling devices, a hollow form over which the fish is passed, and radial scraping-blades journaled to revolve within the form, in combination with endless traveling belts automatically adjustable to and from each other.

28. In a fish-cleaning apparatus, concentric splitting and disemboweling devices, a hollow form over which the fish is passed therefrom, and radial scraping-blades journaled to revolve within the form in combination with guides, and carriers by which the fish is transmitted and presented to each part of the apparatus successively.

29. In a fish-cleaning apparatus, the combination with a carrier and means for retaining the fish in alinement thereon, of a combined splitter and revoluble brush acting together and about a common axis whereby the splitting and cleaning operations occur substantially simultaneously.

30. In a fish-dressing machine, the combination of a carrier including yielding, self-adjusting belts, of a combined splitter and revoluble cleaner interposed between the belts and revoluble about a common axis whereby the splitting and cleaning operations occur substantially simultaneously.

31. In a fish-dressing machine, the combination with a carrier, of a splitter and elastic cleaning blades or brushes on each side thereof said splitter operating but slightly in advance of the cleaner and the cleaning operation occurring substantially simultaneously with the splitting operation.

32. In a fish-dressing machine the combination with a carrier, of a revoluble device including a splitter and cleaning-blades operating upon each side thereof the former opening the fish and the latter substantially simultaneously therewith cleaning the cavity.

33. In a fish-dressing machine, a cutting and cleaning mechanism including a revoluble splitter and a cleaner revoluble therewith and about the same axis said cleaner including blades arranged in series, the first blade of the series being pointed and adapted to remove the membrane and coagulated blood in the channel of the backbone, the second blade having a curvature to one side of the splitter, and the succeeding blade having a curvature toward the opposite side of the splitter whereby the attachment of the entrails on both sides of the abdominal cavity is removed.

34. In a fish-cleaning apparatus, a form over which the split fish is movable lengthwise said form having an opening in the back, combined with a cleaning mechanism revoluble through said opening and in contact with the interior cavity of the fish.

35. In a fish-cleaning apparatus, a hollow form over which the split fish is slidable, said form having an opening in the back, and cleaning devices revoluble through said opening and in contact with the interior cavity of the fish.

36. In a fish-cleaning apparatus, a hollow form over which the split fish is slidable said form having an opening in its back, cleaning devices revoluble through said opening and in contact with the interior cavity of the fish, and means for holding the fish against the form.

In witness whereof we have hereunto set our hands.

WILLIAM MUNN.
AUGUSTUS LOTZ.

Witnesses:
LEE D. CRAIG,
S. C. LEWIS.